(12) United States Patent
Demont et al.

(10) Patent No.: US 6,455,959 B1
(45) Date of Patent: *Sep. 24, 2002

(54) COOLING ARRANGEMENT FOR AN ELECTRICAL MACHINE OF A VEHICLE

(75) Inventors: Stefan Demont, Geldersheim; Jürgen Weimer, Euerbach; Dieter Bauch-Panetzky, Schweinfurt, all of (DE)

(73) Assignee: Mannesmann Sachs AG, Schweinfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 180 days.

(21) Appl. No.: 09/412,028

(22) Filed: Oct. 4, 1999

(30) Foreign Application Priority Data

Oct. 7, 1998 (DE) .......................................... 198 46 220

(51) Int. Cl.⁷ ................................................ H02K 9/08
(52) U.S. Cl. ............................ 310/57; 310/54; 310/58; 310/60 A
(58) Field of Search ............................. 310/52, 54, 57, 310/58, 59, 64, 60 A; 123/41.31; 165/104.19, 104.33

(56) References Cited

U.S. PATENT DOCUMENTS

| 4,295,067 A | * | 10/1981 | Binder et al. ................. 310/52 |
| 4,500,772 A | * | 2/1985 | Ahner et al. .................. 219/202 |
| 4,955,944 A | * | 9/1990 | Aso et al. ................... 123/41.31 |
| 4,958,095 A | * | 9/1990 | Uchida et al. .............. 123/41.31 |
| 5,111,090 A | * | 5/1992 | Otake et al. ................. 180/229 |
| 5,836,270 A | * | 11/1998 | Aoki et al. ............ 123/142.5 R |
| 6,133,659 A | * | 10/2000 | Rao ............................... 123/3 |
| 6,191,511 B1 | * | 2/2001 | Zysset .......................... 310/53 |
| 6,297,571 B1 | * | 10/2001 | Knappenberger ........... 310/263 |
| 6,331,127 B1 | * | 12/2001 | Suzuki ..................... 123/41.31 |
| 6,355,996 B1 | * | 3/2002 | Birkestrand ................ 180/65.5 |

FOREIGN PATENT DOCUMENTS

| DE | 35 43 809 A1 | 6/1987 | .......... H02K/21/02 |
| DE | 19905539 A1 | * 8/2000 | .......... H02K/9/08 |
| EP | 0 302 118 | 2/1988 | .......... H02K/1/20 |
| GB | 2357192 A | * 6/2001 | .......... H02K/9/08 |
| JP | 63-18943 | 1/1988 | .......... H02K/9/02 |
| JP | 9-46970 | 2/1997 | .......... H02K/7/14 |

* cited by examiner

Primary Examiner—Nestor Ramirez
Assistant Examiner—Guillermo Perez
(74) Attorney, Agent, or Firm—Cohen, Pontani, Lieberman & Pavane

(57) ABSTRACT

A cooling arrangement for an electrical machine—for example, a permanent-field synchronous machine of a vehicle. The electrical machine is connected to the engine block of the vehicle. In order to ensure cost-effective cooling of the electrical machine, the electrical machine includes a support element, and the engine block includes a cooling element. At least a region of the electrical machine is connected via the support element to the cooling element of the engine block such that the heat generated during operation of the electrical machine dissipates thermally into the engine block.

17 Claims, 2 Drawing Sheets

COOLING ARRANGEMENT FOR AN ELECTRICAL MACHINE OF A VEHICLE

BACKGROUND OF THE INVENTION

1. Field of the Invention

The present invention relates to motor vehicles, and more particularly to a cooling arrangement for an electrical machine of a vehicle, the electrical machine being connected to the engine block of the vehicle.

2. Description of the Related Art

Such electrical machines are, for example, synchronous machines for generating electrical energy. The generated electrical energy is then made available to all kinds of devices in the vehicle. Among other things, a heat loss, which as a rule results from copper losses and iron losses, is produced during the operation of such electrical machines. However, the heat loss in the electrical machine is undesirable, since it may lead to power losses of the machine and to damage of the latter in the worst case.

The electrical machine must therefore be cooled in order to reduce the heat loss produced in it. To this end, cooling arrangements independent of the electrical machine have been used heretofore. Such cooling arrangements contain, for example, heat exchangers or the like, which are connected to the coolant circuit via appropriate devices such as pumps, etc.

However, the known solutions have a number of disadvantages. First of all, the electrical machine itself has co be provided with appropriate cooling elements. Thus cooling of the electrical machine is only possible at a high design cost. Furthermore, a number of secondary units are required in order to provide a suitable circulation of the coolant. The known cooling arrangements are therefore also relatively costly.

In vehicles with a limited amount of space available in the engine compartment, the known cooling arrangements are particularly disadvantageous in that an excessive amount of the installation space, which is limited anyway, is taken up by a multiplicity of requisite secondary units. Finally, some of the secondary units, such as pumps for example, in turn consume electrical energy, a factor which has an adverse effect on the energy balance of the electrical machine.

SUMMARY OF THE INVENTION

Starting from the aforesaid prior art, it is an object of the present invention to provide a cooling arrangement with which the disadvantages described can be avoided. In particular, a cooling arrangement with which cooling of the electrical machine can be realized in a simple and cost-effective manner is to be provided.

This and other objects are achieved by a cooling arrangement which, according to the invention, comprises a support element on the electrical machine, and a cooling element on the engine block. At least a region of the electrical machine is connected to the cooling element of the engine block via the support element such that heat generated during operation of the electrical machine is dissipated or can be dissipated thermally into the engine block.

Such a cooling arrangement can be realized in a simple and cost-effective manner. The basic idea of the present invention lies in the fact that the electrical machine is thermally connected to the engine block. This thermal connection is effected via the support element and the cooling element. In this case, the heat loss produced in the electrical machine is dissipated into the engine block via the support element, which is preferably an integral part of the electrical machine. The secondary units, such as heat exchangers, pumps or the like, previously required for the cooling of the electrical machine may also be dispensed with. Furthermore, the prior requisite separate cooling of the casing of tile electrical machine is also dispensed with.

The engine for the vehicle may be a conventional internal combustion engine, which, depending on tile embodiment, has a one-piece or multi-piece engine block. The present invention is not restricted to special engine types, since cooling is effected only via the support element of the electrical machine and the cooling element of the engine block, and these two components, depending on the application, may be of any desired design. The only precondition is that good heat transfer between the two elements is ensured.

The electrical machines used may be, for example, synchronous machines and here, in particular, permanent-field synchronous machines. A machine especially worth mentioning is, for example, the starter-generator for vehicles. This is an electrical machine whose rotors are mounted via a crankshaft bearing arrangement of the internal combustion engine. The starter-generator is not only used for starting and stopping the engine but may also perform various functions during the engine operation, such as, for example, braking functions, booster functions, battery management, active vibration damping, synchronization of the internal combustion engine or the like.

Such a starter-generator is designed, for example, as an external-rotor synchronous machine and is connected to the engine block of the internal combustion engine via a stator support as support element. Such machines are especially suited for the heat-conduction cooling according to the invention, since the heat loss inside the machine can be dissipated therefrom directly into the engine block in a simple manner via the stator support and the cooling element of the engine block.

At least a region of the end face of the support element can advantageously bear flat against the end face of the cooling element and essentially free of gaps. Good heat transfer is thereby provided between the cooling element and the support element, resulting in a further improvement of the dissipation of the heat loss produced in the electrical machine into the engine block. To enlarge the surface provided for the thermal transfer, the end face of the support element and/or of the cooling element may of course also be designed such that it is not flat.

In a further embodiment, the cooling element may be provided on an end face of the engine block. In this case, the cooling element is advantageously designed such that good heat transfer is ensured. In principle, both end faces of the engine block are possible for the arrangement of the cooling element. However, the cooling element is preferably arranged on that end face of the engine block which faces the transmission. Furthermore, it is also possible for the electrical machine to be fastened to the cooling element via the support element.

The cooling element may also be designed, for example, as an integral section of the engine block. As a result, the cooling element may be produced directly along with the engine block in one operation during the manufacture of the engine block—for instance by a casting process, a factor which constitutes a solution which is simple in terms of design and is cost-effective.

However, it is also conceivable for the cooling element to first of all be produced as a separate component and to then be connected to the engine block. With such a solution, a, material having especially pronounced heat-conduction properties could be used, for example, for the cooling element. This would result in the heat transfer between the electrical machine and the engine block being further improved. Such a separately produced cooling element may be suitably connected to the engine block in a detachable manner or by cohesive bonding. Examples of advantageous types of connection are, inter alia, welded connections, screwed connections or the like. In particular in the case of a screwed connection, the cooling element may be additionally positioned via mating pins, mating sleeves or a centering diameter.

Since the end face of the engine block generally has a number of webs, projections, bulges and the like, which extend outward from the end face of the engine block, the cooling element is preferably of a height which approximately corresponds to the height of the elements described above. The cooling element may of course be of a different height.

In a further embodiment, the cooling element may be design as a ring element. The cooling element designed in such a way is preferably arranged concentrically around the crankshaft of the engine block. The ring element may be designed, for example, as a continuous ring, as a result of which the area for the heat transfer is increased further. Such a design of the cooling element is appropriate, for example, when the engine block is of one-piece design. Given appropriate dimensioning of the cooling element, the support element of the electrical machine may also be fastened to the cooling element at the same time.

In another embodiment, the cooling element may be formed from a number of cooling-element segments. In this case, the cooling-element segments may be ring segments which have an intermediate space between them Such a design is appropriate, for example, when the engine block is of multi-piece design and each cooling-element segment is produced together with the respective part of the engine block.

The invention is of course not restricted to special geometries and sizes of the cooling-element segments. On the contrary, the size and/or shape of the cooling-element segments, depending on requirement and application, may be selected as desired. As a result, effective heat-conduction cooling can be realized even in the case of complicated types of engine construction. The only precondition is that the cooling element in its entirety has a sufficiently large area in order to dissipate the heat transferred via the support element of the electrical machine.

The electrical machine can preferably be detachably connected to the cooling element of the engine block via the support element. Such a connection may be produced, for example, via a suitable screwed connection. in this case, the support element may be connected to the cooling element of the engine block or else directly to the engine block itself. In addition, mating pins, mating sleeves or a centering diameter may be provided for the positioning of the support element.

In yet a further embodiment, at least one cooling helix or a least one cooling passage is provided in the cooling element. As a result, the dissipation of the heat loss from the electrical machine and thus its cooling may be further improved. The cooling helix or the cooling passage may advantageously be designed as an open groove construction on that end face of the cooling element which faces the support element. The production of such a cooling helix or such a cooling passage is especially simple and cost-effective.

In another embodiment, at least one cooling helix or at least one cooling passage is provided in the support element, As a result, additional cooling of the electrical machine is achieved.

The cooling helix or the cooling passage is preferably designed as an open groove construction on that end face of the support element which faces the cooling element.

In a design of the cooling helix or of the cooling passage as an open groove construction on either the cooling element or the support element, the other respective element which does not have such a groove construction, can seal off the corresponding groove, as a result of which a closed cooling helix overall or a cooling passage is obtained. The production of such a groove construction is especially simple. Furthermore, the coolant flowing through the cooling passage or the cooling helix, from the cooling system of the engine block can act at the direct transition between the support element and the cooling element (the location of the direct heat transfer), as a result of which the cooling effect is fixer improved.

The open groove constructions of the cooling element and the support element may advantageously be arranged one on top of the other. When an open groove construction is used in both the cooling element and the support element, the cross section of the entire cooling helix or of the entire cooling passage can be enlarged, which is advantageous for the cooling effect.

In a further refinement, the cooling helix or the cooling passage of the support element and/or of the cooling element may be connected to a cooling system of the engine block. As a result, use may be made of already existing cooling systems of the engine block in a simple manner for the additional cooling.

Advantageously at least a region of the cooling element and/or of the support element may be formed from a material having a high thermal conductivity. As a result, the heat conduction is increased further. For example, it is conceivable for the cooling element and/or the support element to be of sandwich-like construction, individual layers being formed from the especially heat-conductive material. Other embodiments in which the elements are formed from such an especially good heat-conducting material only in quite specific defined regions are of course also conceivable. As a result, regions with preferred heat conduction can be deliberately produced. In an advantageous embodiment, the entire cooling element and/or support element may be formed from a material having especially good heat conductivity.

In a further embodiment, a coolant having high thermal conductivity may be provided in or may be capable of being directed into the cooling helix or the cooling passage of the support element and/or of the cooling element. As a result, the heat transfer between the two elements is further improved. In principle, solid, liquid and gaseous substances are conceivable as the coolant.

The invention is not restricted to special materials or coolants with high thermal conductivity, however, among other things, a sodium based or Fregen substitutes are conceivable.

In yet a further embodiment, the at least one cooling helix or the at least one cooling passage of the cooling element and of the support element may be connected to one another via a connecting element. If the cooling helix or the cooling passage is formed only in the support element or the cooling element, this cooling helix/cooling passage may be connected to the cooling system of the engine block via a corresponding connecting element. By the use of such a connecting element, which is preferably made of an elastic material, the connection between the cooling helices or cooling passages to each other or to the cooling system can be rendered flexible, as a result of which, production tolerances can be compensated for.

The connecting element preferably has at least one sealing element. Such a sealing element which may be, for example, an O-ring or the like.

The above-described cooling arrangement according to the invention may be advantageously used for cooling a permanent-field synchronous machine, preferably a starter-generator, arranged on an engine block of a vehicle.

The various features of novelty which characterize the invention are pointed out with particularity in the claims annexed to and forming a part of the disclosure. For a better understanding of the invention, its operating advantages, and specific object attained by its use, reference should be had to the drawing and descriptive matter in which there are illustrated and described preferred embodiments of the invention.

BRIEF DESCRIPTION OF THE DRAWINGS

The invention will now be explained in more detail by way of example with the aid of an exemplary embodiment and with reference to the attached drawing, in which.

DETAILED DESCRIPTION OF THE PRESENTLY PREFERRED EMBODIMENTS

Figure 1:
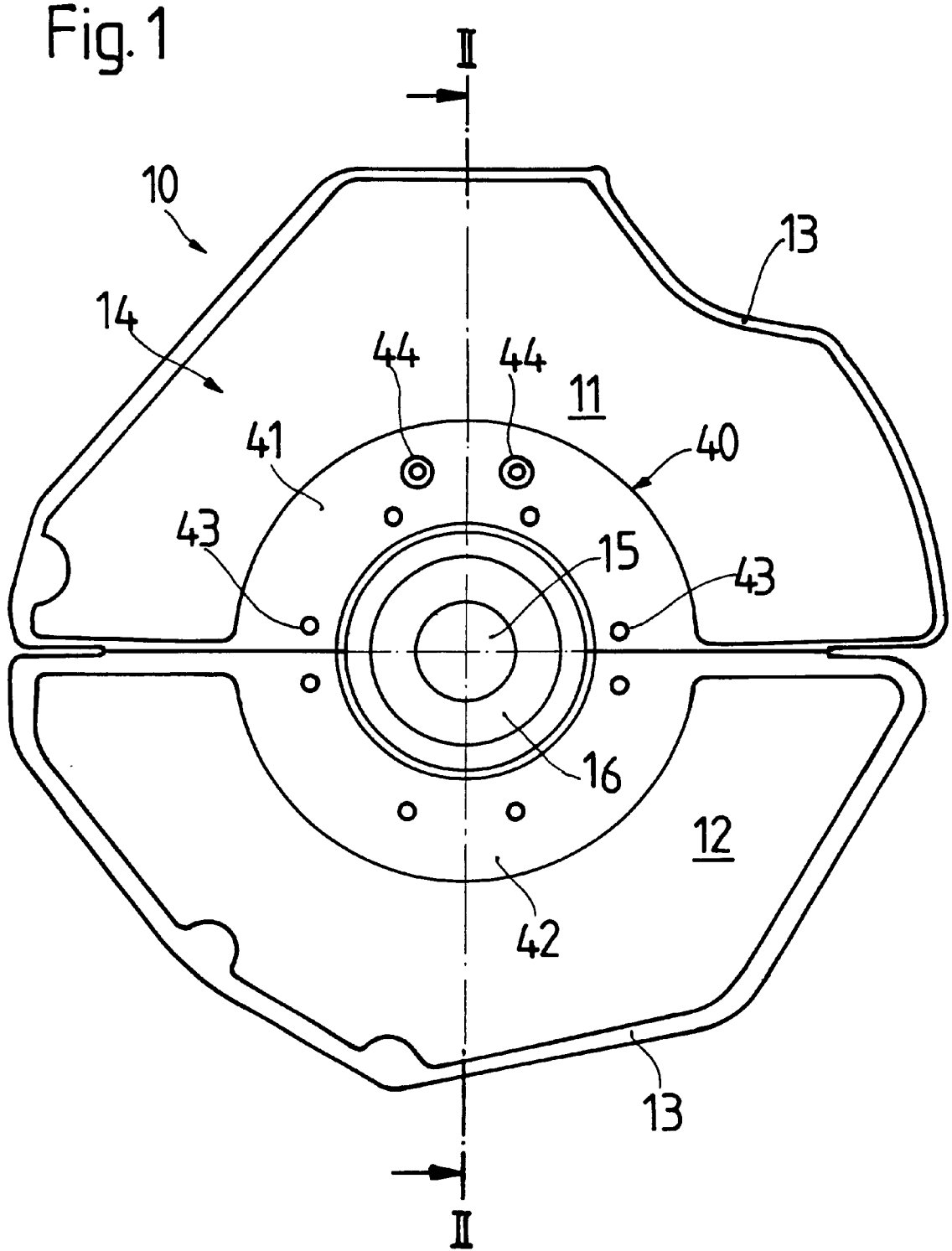
FIG. 1 is a schematic plan view of the end face of an engine block.

FIG. 1 shows an engine block 10, which is made of cast material and consists of two engine-block halves 11 and 12. Each of the engine-block halves 11 and 12 has a number of webs 13 which are conventional in engine building. The two engine-block halves 11 and 12 surround a crankshaft 15, which is supported and sealed via a crankshaft bearing 16.

The engine block 10 has a cooling element 40, which is formed from two half-ring-shaped cooling-element segments 41 and 42. The cooling-element segments 41 and 42 form an essentially annular cooling element 40, which is arranged concentrically around the crankshaft 15 of the engine block 10. The individual cooling-element segments 41 and 42 are formed integrally with the engine-block halves 11, 12. This means that the cooling-element segments 41, 42 are produced at the same time along with the engine-block halves 11, 12 during the casting process. The height of the cooling element 40 corresponds approximately to the height of the webs 13.

Figure 2:
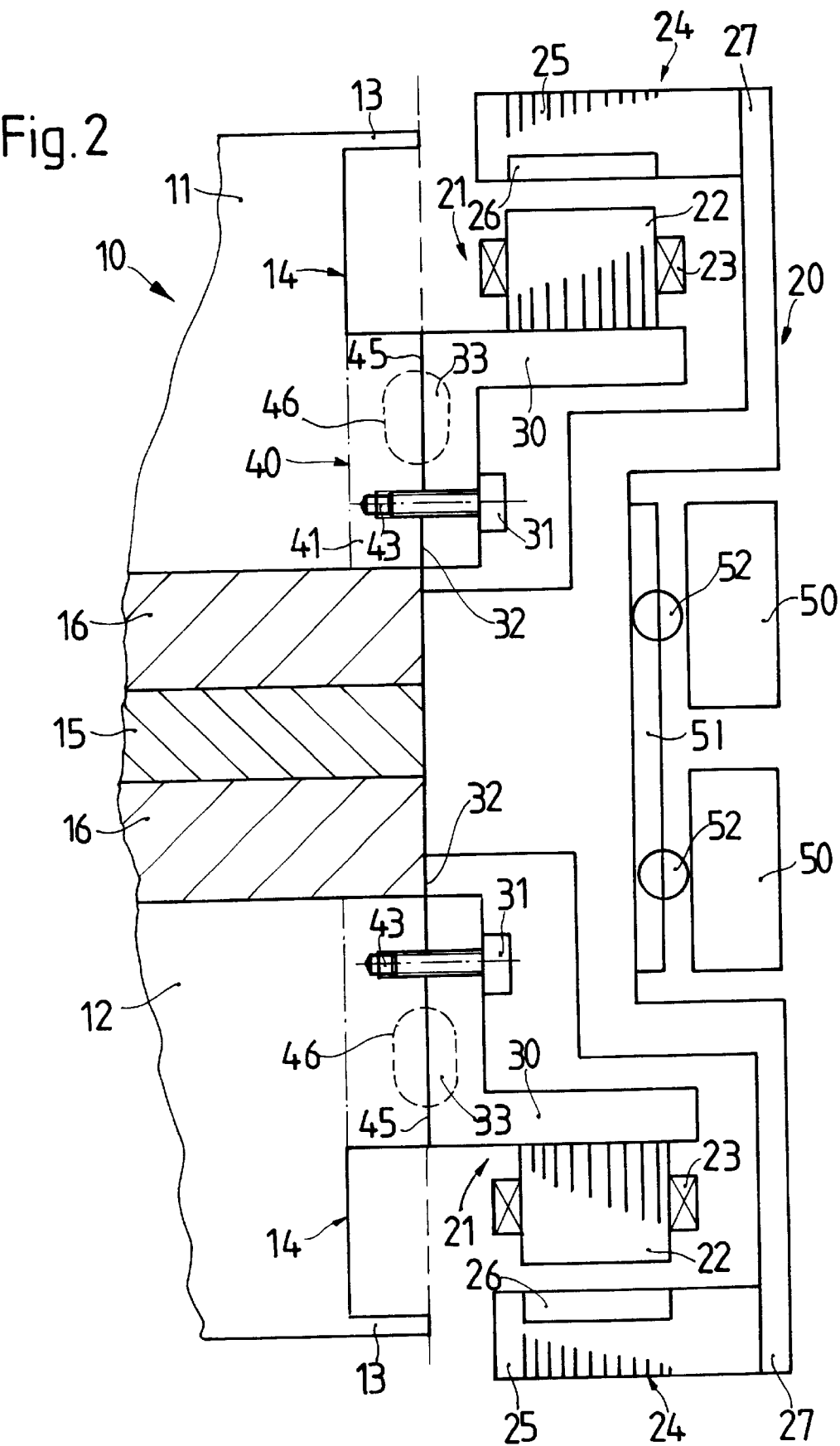
FIG. 2 is a schematic cross-sectional view along section line II—II from FIG. 1, with an electrical machine being additionally shown.

For the detachable fastening of an electrical machine 20 shown in FIG. 2, the cooling element 40 has a number of tapped holes 43, in which corresponding screws 31 can be screwed. Four times two tapped holes 43 are shown in FIG. 1. In addition, two or more openings 44, which are connected to a cooling system (not shown) of the engine block 10, are provided in the cooling element 40. These openings 44 are required when the cooling element 40 and the support element 30 (described below) of the electrical machine 20 are additionally to be cooled via the cooling system of the engine block 10. If the cooling is to be effected solely in the form of heat-conduction cooling, the openings 44 may be dispensed with.

FIG. 2 shows the engine block 10 in a highly schematic sectional representation along section line II—II from FIG. 1. As can clearly be seen in FIG. 2, the cooling element 40 forms an integral part of the engine block 10. This is shown by chain-dotted lines.

An electrical machine 20 is detachably arranged on the engine block 10 via screws 31. The electrical machine 20 is designed as a permanent-field external-rotor synchronous machine and has the function of a starter-generator.

The electrical machine 20 has a stator 21, which is connected to the engine block 10 via a support element 30 designed as a stator support. The stator 21 has stator laminations 22 and stator windings 23. Furthermore, the electrical machine 20 has a rotor 24 with corresponding rotor laminations 25 and magnets 26, the rotor 24 being connected to a suitable flywheel 27. The flywheel 27 is designed such that a clutch system 50 may be arranged inside it and thus also inside the electrical machine 20. The clutch system 50, which may also be designed as a converter, twin-mass disk or the like, may of course also be arranged only partly inside the electrical machine 20 or else even next to the latter. In addition, one or more clutch disks are provided between the clutch system 50 and the flywheel 27. The damping of the clutch system 50 is effected via suitable damping elements 52 or absorption elements, which may be designed as springs for example.

The support element 30 and the cooling element 40, or its cooling-element segments 41 and 42, bear flat against one another and essentially free of gaps via their respective end faces 32 and 45. Good heat transfer between the elements is thereby ensured.

If the starter-generator (electrical machine) 20 is now operated, heat loss is produced due to the copper losses and the iron losses, and this heat loss has to be dissipated from the starter-generator 20. To this end, the heat loss is transferred into the cooling element 40 via the support element 30, which of course is thermally connected to the engine block 10 via the cooling element 40, and are dissipated from the later directly into the engine block 10. Since the end faces 32, 45 of the support element 30 and the cooling element 40 bear against one another over their full area, good dissipation of the heat losses from the starter-generator 20 is ensured.

The possibility of additional cooling via the cooling system of the engine block 10 is shown in FIG. 2 by the construction elements 33 and 46 shown by broken lines. These are cooling passages which are designed as open groove constructions in each case on those end faces 45, 32 of the support element 30 and cooling element 40 which face the support element 30 and the cooling element 40 respectively. The representation in broken lines indicates that the cooling passages 46 and 33 are optional features. The open cooling passages 33 and 46 are arranged one on top of the other in such a way that they form a closed complete cooling passage. This passage is connected via suitable connecting means to the cooling system (not shown) of the engine block. The large cross section of the complete cooling passage additionally improves the heat dissipation from the starter-generator 20 into the engine block 10.

The invention is not limited by the embodiments described above which are presented as examples only but can be modified in various ways within the scope of protection defined by the appended patent claims.

We claim:

1. A cooling arrangement for an electrical machine of a motor vehicle, comprising:

a support element on the electrical machine having a support element end face;

a cooling element disposed on an engine block of the motor vehicle having a cooling element end face, wherein at least a region of the electrical machine is connected to the cooling element via said support element such that heat generated during operation of the electrical machine is dissipated thermally into the engine block; and a first coolant passage filled with a heat-conductive material and comprising an open groove having a closed end and an open end operatively arranged in at least one of: said support element end face, and said cooling element end face, for facilitating heat transfer via thermal conduction between said support element and said cooling element, wherein said open end of said open groove faces the other one of said support element end face and said cooling element end face so that said first coolant passage comprises an isolated closed cooling passage.

2. The cooling arrangement in accordance with claim 1, said wherein at least a region of said support element end face bears flat against said cooling element end face and is substantially free of gaps.

3. The cooling arrangement in accordance with claim 1, wherein the engine block comprises an end face, wherein said cooling element is disposed on said end face of the engine block.

4. The cooling arrangement in accordance with claim 1, wherein the engine block of the motor vehicle comprises at least one crankshaft, and said cooling element comprises a ring element concentrically arranged around the crankshaft.

5. The cooling arrangement in accordance with claim 1, wherein said cooling clement comprises a plurality of segments.

6. The cooling arrangement in accordance with claim 1, wherein the electrical machine is detachably connected to said cooling element via said support element.

7. The cooling element in accordance with claim 1, wherein said heat-conductive material comprises a coolant sealed in said first coolant passage such that said coolant is prevented from flowing out of said first coolant passage.

8. The cooling arrangement in accordance with claim 1, wherein said first coolant passage is disposed within said support element.

9. The cooling arrangement in accordance with claim 8, further comprising a second coolant comprising an open groove having a closed end and an open end operative arranged the other one of said support element end face and said cooling element end face, wherein said open end of said second coolant passage faces said open end of said first coolant passage.

10. The cooling arrangement in accordance with claim 8, wherein the engine block further comprises a cooling system, wherein said first coolant passage of said support element is connected for conducting thermal energy to said engine block cooling system.

11. The cooling arrangement in accordance with claim 10, further comprising a connecting element for thermally connecting said first coolant passage to said cooling system of the engine block.

12. The cooling arrangement in accordance with claim 11, wherein said connecting element further comprises at least one sealing element.

13. The cooling arrangement in accordance with claim 8, further wherein said heat-conductive material comprises a coolant.

14. The cooling arrangement in accordance with claim 1, wherein the engine block further comprises a cooling system, wherein said first coolant passage of said cooling element is connected for conducting thermal energy to said engine block cooling system.

15. The cooling arrangement in accordance with claim 14, further comprising a connecting element for thermally connecting said first coolant passage to said cooling system of the engine block.

16. The cooling arrangement in accordance with claim 15, wherein said connecting element further comprises at least one sealing element.

17. The cooling arrangement in accordance with claim 1, wherein said heat-conductive material comprises a coolant.

* * * * *